US009509829B2

(12) United States Patent
Culbert et al.

(10) Patent No.: US 9,509,829 B2
(45) Date of Patent: Nov. 29, 2016

(54) URGENT COMMUNICATIONS

(75) Inventors: Michael Culbert, Monte Sereno, CA (US); Scott Forstall, Mountain View, CA (US); Henri Lamiraux, San Carlos, CA (US); Michael Lee, San Jose, CA (US); David Tupman, San Francisco, CA (US)

(73) Assignee: Apple, Inc., Cupertino, CA (US)

( * ) Notice: Subject to any disclaimer, the term of this patent is extended or adjusted under 35 U.S.C. 154(b) by 1110 days.

(21) Appl. No.: 12/005,713

(22) Filed: Dec. 28, 2007

(65) Prior Publication Data
US 2009/0170486 A1   Jul. 2, 2009

(51) Int. Cl.
*H04M 11/04* (2006.01)
*H04M 1/725* (2006.01)

(52) U.S. Cl.
CPC ....... *H04M 1/72547* (2013.01); *H04M 1/7253* (2013.01); *H04M 2242/04* (2013.01)

(58) Field of Classification Search
CPC .. G08B 25/10; G08B 27/006; G08B 25/009; G08B 25/012; G08B 7/066; G08B 21/88; H04M 1/66; H04W 12/08; H04W 48/04; H04W 8/22; H04W 4/16; H04W 4/22; H04W 4/027; H04W 52/0251; H04W 52/0254; H04W 68/00; H04W 88/02; H04W 88/022; H04W 88/06; H04W 8/245; H05B 37/0272
USPC ........................................ 379/93.19; 455/417
See application file for complete search history.

(56) References Cited

U.S. PATENT DOCUMENTS

| | | | |
|---|---|---|---|
| 6,323,846 B1 | 11/2001 | Westerman et al. | |
| 6,504,480 B1 * | 1/2003 | Magnuson et al. | 340/571 |
| 6,542,586 B1 * | 4/2003 | Helstab | 379/93.19 |
| 7,627,343 B2 | 12/2009 | Fadell et al. | |
| 2001/0031633 A1 * | 10/2001 | Tuomela et al. | 455/417 |
| 2004/0213401 A1 * | 10/2004 | Aupperle et al. | 379/372 |
| 2006/0063563 A1 * | 3/2006 | Kaufman | 455/556.2 |
| 2007/0152983 A1 | 7/2007 | McKillop et al. | |
| 2007/0201627 A1 * | 8/2007 | Lin et al. | 379/67.1 |
| 2007/0207839 A1 * | 9/2007 | Buti et al. | 455/567 |
| 2008/0102783 A1 * | 5/2008 | Bustamante | 455/404.1 |
| 2008/0238614 A1 * | 10/2008 | Delia et al. | 340/5.85 |
| 2009/0110162 A1 * | 4/2009 | Chatterjee | 379/93.23 |
| 2009/0165145 A1 * | 6/2009 | Haapsaari et al. | 726/28 |
| 2009/0170492 A1 | 7/2009 | Lee | |
| 2009/0252303 A1 * | 10/2009 | Agarwal | 379/37 |

* cited by examiner

*Primary Examiner* — Nimesh Patel
(74) *Attorney, Agent, or Firm* — Meyertons, Hood, Kivlin, Kowert & Goetzel, P.C.

(57) ABSTRACT

A communications system by which a user may provide inputs using an accessory device is provided. The accessory device may provide instructions to the communications device over any suitable wired or wireless communications path. The accessory device may include any suitable input mechanism for providing an input, including for example one or more switches, sliders, knobs, keys, motion sensing components, environmental sensing components, or any other input mechanism that the user may actuate. A communications system by which a communications device may transmit urgent communications requests is provided. The user may select an urgent option when transmitting a communications request to cause the recipient communications device to enable an urgent mode in which the recipient communications device may change the notification scheme to ensure that the recipient receives the urgent communications request.

18 Claims, 10 Drawing Sheets

URGENT COMMUNICATIONS

BACKGROUND OF THE INVENTION

This relates to a communications device operative to discreetly perform hands-free communications operations.

While one clear advantage of communications devices, and in particular of portable communications devices is that users of such devices may be always or nearly always accessible, users may sometimes find themselves in situations where receiving a communications request is not advisable. For example, a user may be in an important business meeting during which receiving communications requests may be seen as disruptive or even rude. As another example, a user may be driving an automobile or motorcycle, during which incoming communications requests may be distracting and even dangerous.

To limit the disruption caused by incoming communications requests during such times, the user may turn off the communications device, or disable one or more notifications of the communications device (e.g., turn the ringer off). While such solutions may reduce disruptions, they may also cause the user to miss communications requests that the user does not want to miss, despite the user's current situation (e.g., a call from a supervisor or spouse).

Furthermore, even if the user were to accept a communications request during a meeting, the user would still need to tell the other party to hold while the user steps out, or leave the other party hanging after picking up as the user steps out. Such approaches may cause either those with whom the user is meeting to feel disrespected as the user ignores them to speak with the other party, or may leave the other party frustrated, believing that the communications operation failed.

SUMMARY OF THE INVENTION

A system by which a user may provide a discreet input to a communications device without the use of the user's hand is provided. In particular, the communications device may be in communication with an accessory device operative to receive inputs provided without the user's hands.

The accessory device may provide instructions to the communications device over any suitable wired or wireless communications path. If a wireless communications path is used, the accessory device, the communications device, or any other device may be used to create a communications network by which the communications path is provided. The accessory device may include any suitable mechanism for receiving an input from the user. For example, the accessory device may include one or more switches, sliders, knobs, keys, motion sensing components, environmental sensing components, or any other input mechanism that the user may actuate.

The accessory device may be a stand-alone device, or may be integrated with another device or object. For example, the accessory device may be integrated in a shoe, belt, watch, apparel or accessory. As another example, the accessory device may be integrated in an electronic device (e.g., a headset, watch, cellular telephone). As still another example, the accessory device may be integrated in an object located in the vicinity of the user (e.g., under a conference room table, on the floor, in the user's chair, or in an object on a user's desk).

The user may provide an input by moving or touching the integrated accessory device in a suitable manner (e.g., pressing a switch with a user's toes, or tap the user's feet). In some embodiments, the user may provide an input by moving the object in which the accessory device is integrated in a particular manner. For example, the user may move a headset or watch such that a motion sensing component detects the movement of the accessory device and provides an instruction to the communications device. In some embodiments, the user may provide an input by changing the environment in which the accessory device is located. For example, the user may change the amount of light to which the accessory device is exposed to cause an environmental sensing component to detect a change in the environment and provide an instruction to the communications device.

The user may provide any suitable instruction to the communications device using the accessory device. For example, the communications device may display options that may be selected using the accessory device. The options may include, for example, accepting or refusing a communications request, modifying the notification of an incoming communications request, or transferring the communications request to a mail box (e.g., voicemail). In some embodiments, the options may include one or more messages or responses that the communications device may provide to the sender of the communications request. For example, the messages may be default responses, or user-generated messages. The messages may include audio, text, or any other suitable type of data.

In some embodiments, a user may transmit an urgent communications request to ensure that the recipient receives the communications request in a timely manner. The user may direct the communications device to provide an urgent communications request using any suitable approach, including for example selecting an urgent when transmitting the communications request. In some embodiments, the user may be required to provide a code or key for verifying that the user is authorized to transmit an urgent communications request.

The communications device may transmit an urgent communications request using any suitable approach. For example, the communications device may transmit additional data (e.g., metadata or a flag) with the communications request. As another example, the communications device may transmit several different communications requests using different communications modes to indicate an urgent communications request (e.g., simultaneously dial a telephone number and send a text message to the same number). As still another example, the communications device may send a communications request to an address that is associated with urgent communications (e.g., call a telephone number for urgent calls instead of a telephone number for ordinary calls).

In response to receiving an urgent communications request, the recipient communications device may enable an urgent mode in which notifications of communications request are more noticeable. For example, notifications in the urgent mode may include audio notifications (e.g., when only vibrating notifications were enabled). As another example, the volume or intensity of a notification may change (e.g., increase). As still another example, the type of notification may change (e.g., using a different audio notification, or change the vibration pattern for the vibrating notification). Any other type of notification that would make a communications request noticeable to the user may be used in an urgent mode of operation.

BRIEF DESCRIPTION OF THE DRAWINGS

The above and other features of the present invention, its nature and various advantages will be more apparent upon consideration of the following detailed description, taken in conjunction with the accompanying drawings in which.

DETAILED DESCRIPTION

Figure 1:
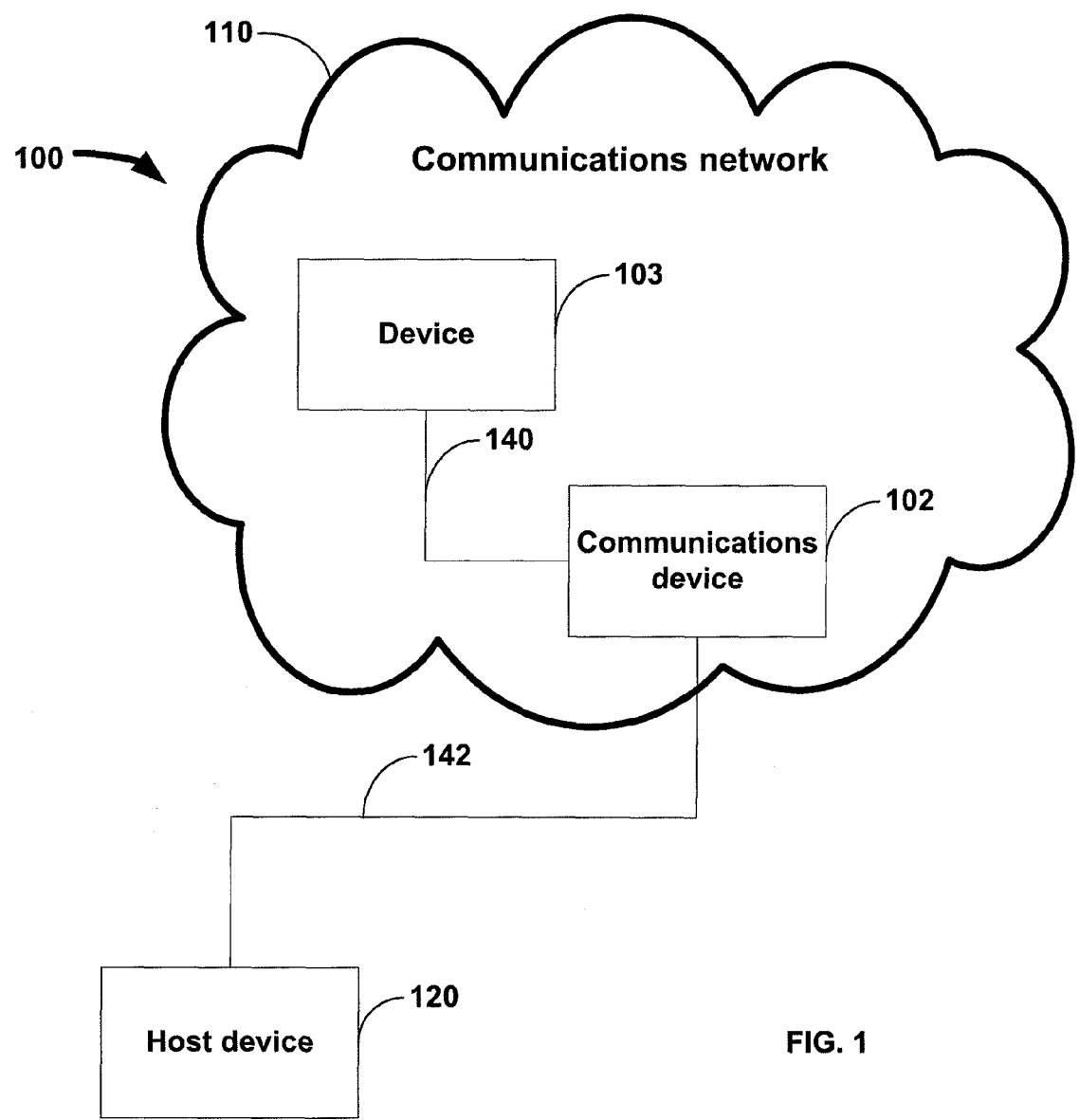
FIG. 1 is a schematic view of a communications system in accordance with one embodiment of the invention.

FIG. 1 is a schematic view of a communications system in accordance with one embodiment of the invention. Communications system 100 may include communications device 102, and communications network 110, which communications device 102 may use to perform wireless communications with other devices within communications network 110 (e.g., device 103). Although communications system 100 may include several of communications devices 102, devices 103, and hosts 120, only one of each is shown in FIG. 1 to avoid overcomplicating the drawing.

Any suitable circuitry, device, system or combination of these (e.g., a wireless communications infrastructure including communications towers and telecommunications servers) operative to create a communications network may be used to create communications network 110. Communications network 110 may be capable of providing wireless communications using any suitable short-range or long-range communications protocol. In some embodiments, communications network 110 may support, for example, Wi-Fi (e.g., a 802.11 protocol), Bluetooth (registered trademark), high frequency systems (e.g., 900 MHz, 2.4 GHz, and 5.6 GHz communication systems), infrared, other relatively localized wireless communication protocol, or any combination thereof. In some embodiments, communications network 110 may support protocols used by wireless and cellular phones and personal email devices (e.g., a Blackberry®). Such protocols can include, for example, GSM, GSM plus EDGE, CDMA, quadband, and other cellular protocols. In another example, a long range communications protocol can include Wi-Fi and protocols for placing or receiving calls using VOIP or LAN. Communications device 102 and device 103, when located within communications network 110, may wirelessly communicate over a local wireless communication path such as path 140.

Communications device 102 and device 103 may be any suitable device for sending and receiving communications. For example, communications device 102 and device 103 may include a media player such as an iPod available by Apple Inc., of Cupertino, Calif., a cellular telephone, a personal e-mail or messaging device (e.g., a Blackberry® or a Sidekick®), an iPhone available from Apple Inc., pocket-sized personal computers such as an iPAQ Pocket PC available by Hewlett Packard Inc., of Palo Alto, Calif., personal digital assistants (PDAs), a desktop computer, a laptop computer, and any other device capable of communicating wirelessly (with or without the aid of a wireless enabling accessory system). The communications sent and received may be any suitable form of communications, including for example, voice communications (e.g., telephonic communications), data communications (e.g., e-mails, text messages, media messages), or combinations of these.

In some embodiments, communications device 102 or device 103 may be coupled to host device 120 for data transfers, synching the communications device, software or firmware updates, or performing any other suitable operation that may require communications device 102 and host device 120 to be coupled. In some embodiments, several communications devices 102 may be coupled to host 120 to share data using host 120 as a server. In some embodiments, communications device 102 may be coupled to several host devices 120 (e.g., for each of the plurality of host devices 120 to serve as a backup for data stored in communications device 102).

Communications device 102 may be coupled with host device 120 over communications link 142 using any suitable approach. For example, communications device 102 may use any suitable wireless communications protocol to connect to host device 120 over communications link 142. As another example, communications link 142 may be a wired link that is coupled to both communications device 102 and host device 120. As still another example, communications link 142 may include a combination of wired and wireless links (e.g., an accessory device for wirelessly communicating with communications device 102 is coupled by a wire to host device 120). Any suitable connector, dongle or docking station may be used to couple communications device 102 and host device 120. A more detailed discussion of a dongle or docking station that can be plugged into communications device 102 can be found, for example, in U.S. Pat. No. 7,627,343, which issued on Dec. 1, 2009, and which is incorporated by reference in its entirety herein.

Figure 2:
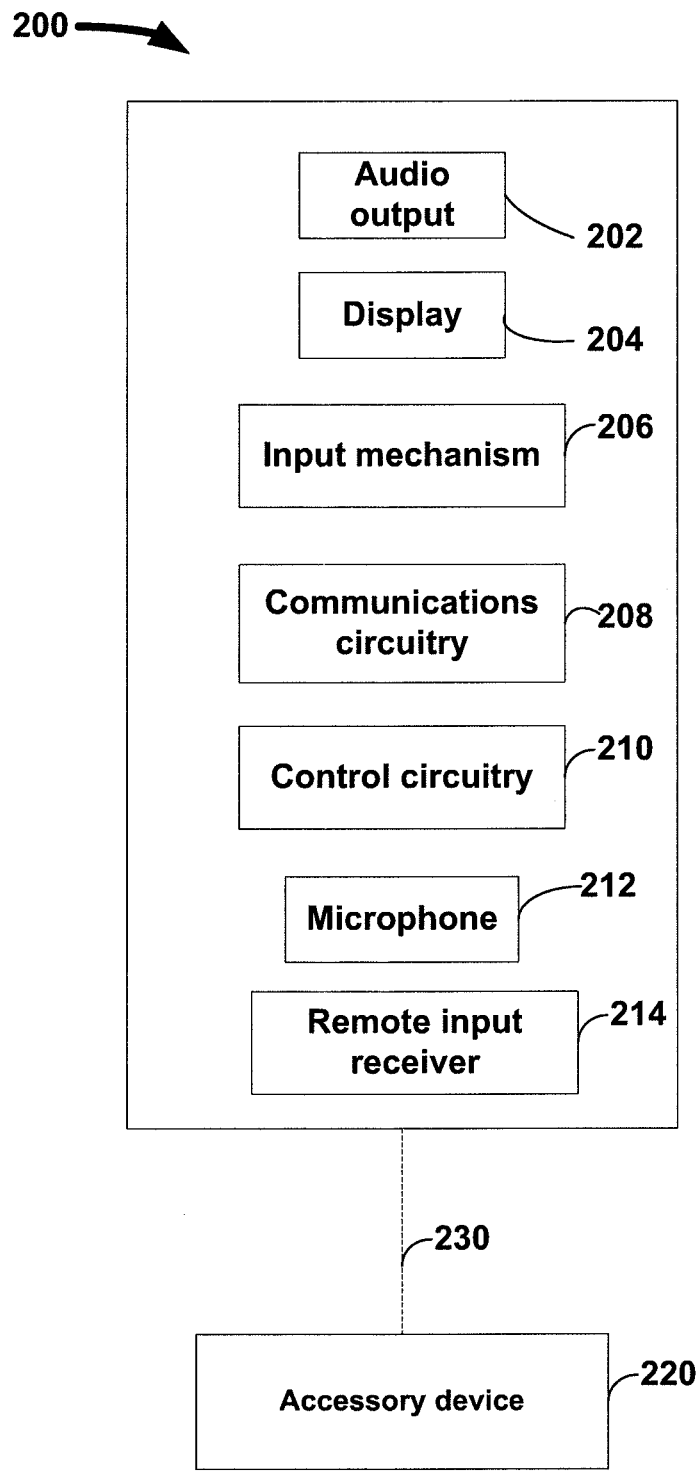
FIG. 2 is a schematic view of a communications device in accordance with one embodiment of the invention.

FIG. 2 is a schematic view of a communications device in accordance with one embodiment of the invention. Communications device 200 may include audio output 202, display 204, input mechanism 206, communications circuitry 208, control circuitry 210 and microphone 212.

Audio output 202 may include any suitable audio component for providing audio to the user of communications device 200. For example, audio output 202 may include one or more speakers (e.g., mono or stereo speakers) built into communications device 200. In some embodiments, audio output 202 may include an audio component that is remotely coupled to communications device 200. For example, audio output 202 may include a headset, headphones or earbuds that may be coupled to communications device with a wire (e.g., coupled to communications device 200 with a jack) or wirelessly (e.g., Bluetooth® headphones or a Bluetooth® headset).

Display 204 may include any suitable screen or projection system for providing a display visible to the user. For example, display 204 may include a screen (e.g., an LCD screen) that is incorporated in communications device 200. As another example, display 204 may include a movable display or a projecting system for providing a display of content on a surface remote from communications device 200 (e.g., a video projector). Display 204 may be operative to display content (e.g., information regarding ongoing communications operations, information regarding incoming communications requests, interruptions, or device operation screens) under the direction of control circuitry 210.

Input mechanism 206 may be any suitable mechanism for providing user inputs or instructions to communications device 200. Input mechanism 206 may take a variety of forms, such as a button, keypad, dial, a click wheel, or a touch screen. The user interface may include a multi-touch screen such as that described in U.S. Pat. No. 6,323,846, which is incorporated by reference herein in its entirety. The user interface may emulate a rotary phone or a multi-button keypad, which may be implemented on a touch screen or the combination of a click wheel or other user input device and a screen. A more detailed discussion of such a rotary phone interface may be found, for example, in U.S. patent application publication No. 2007/0152983, published on Jul. 5, 2007, and entitled "Touch Pad with Symbols based on Mode," which is incorporated by reference herein in its entirety.

Communications circuitry 208 may be any suitable communications circuitry operative to connect to a communications network (e.g., communications network 110, FIG. 1) and to transmit communications (e.g., voice or data) from communications device 200 to other devices within the communications network. Communications circuitry 208 may be operative to interface with the communications network using any suitable communications protocol such as, for example, Wi-Fi (e.g., a 802.11 protocol), Bluetooth (registered trademark), high frequency systems (e.g., 900 MHz, 2.4 GHz, and 5.6 GHz communication systems), infrared, GSM, GSM plus EDGE, CDMA, quadband, and other cellular protocols, VOIP, or any other suitable protocol.

In some embodiments, communications circuitry 208 may be operative to create a communications network using any suitable communications protocol. For example, communications circuitry 208 may create a short-range communications network using a short-range communications protocol to connect to other devices. For example, communications circuitry 208 may be operative to create a local communications network using the Bluetooth® protocol to couple communications device 200 with a Bluetooth® headset.

Communications device 200 may include one more instances of communications circuitry 208 for simultaneously performing several communications operations using different communications networks, although only one is shown in FIG. 2 to avoid overcomplicating the drawing. For example, communications device 200 may include a first instance of communications circuitry 208 for communicating over a cellular network, and a second instance of communications circuitry 208 for communicating over Wi-Fi or using Bluetooth. In some embodiments, the same instance of communications circuitry 208 may be operative to provide for communications over several communications networks.

Control circuitry 210 may be operative to control the operations and performance of communications device 200. Control circuitry 210 may include, for example, a processor, a bus (e.g., for sending instructions to the other components of communications device 200), memory, storage, or any other suitable component for controlling the operations of communications device 200. In some embodiments, a processor may drive the display and process inputs received from the user interface. The memory and storage may include, for example, cache, Flash, ROM, and/or RAM. In some embodiments, memory may be specifically dedicated to storing firmware (e.g., for device applications such as an operating system, user interface functions, and processor functions). In some embodiments, memory may be operative to store information related to other devices with which the communications device performs communications operations (e.g., ranking information, devices which are authorized to interrupt, or tier information).

In some embodiments, communications device 200 may include microphone 212. For example, communications device 200 may include microphone 212 to allow the user to transmit audio (e.g., voice audio) during a communications operation. Microphone 212 may be incorporated in communications device 200, or may be remotely coupled to communications device 200. For example, microphone 212 may be incorporated in wired headphones, or microphone 212 may be incorporated in a wireless headset.

Communications device 200 may include any other component suitable for performing communications operations. For example, communications device 200 may include a power supply, ports or interfaces for coupling to a host device, a secondary input mechanism (e.g., an ON/OFF switch), or any other suitable component.

In some embodiments, communications device 200 may be in communication with accessory device 220 over communications link 230. Accessory device 220 may include any suitable input device for providing an input to communications device 200 from a location distinct from communications device 200 (e.g., a remote input device). Accessory device 220 may include control circuitry, communications circuitry for communicating with communications device 200 and any suitable input mechanism or component for receiving an input from a user. The input mechanism may be operative to receive interactions, and may identify an input associated with a received interaction to provide to the communications device. Alternatively, the accessory device may provide a received input or interaction directly to the communications device. In some embodiments, the input mechanism or component may be operative to receive handsfree user interactions. For example, accessory device 220 may include one or more switches, sliders, knobs, keys, or any other input mechanism that the user may actuate. As another example, accessory device 220 may include a motion sensing component operative to interpret motion of accessory device 220 as inputs. Suitable motion sensing components may include, for example, one or more accelerometers, gravimeters, gyroscopes, inclinometers, pressure sensors, or combinations thereof. When the user moves accessory device 220 in a particular manner, the motion sensing component of accessory device 220 may detect the motion and transcribe the motion into a particular input.

As still another example, accessory device 220 may include one or more environmental sensing components operative to interpret conditions surrounding communications device 200 or accessory device 220 as inputs. Suitable environmental sensing components may include, for example, proximity sensors, thermal sensors, optical sensors, infra-red sensors, light sensors, electrical sensors, magnetism sensors, pressure, acoustic sensors, motion sensors, or any other suitable type of sensor. For example, accessory device 220 may include a pressure sensor (e.g., embedded in a user's shoe) operative to direct accessory device 220 to provide an input to communications device 200 in response to determining that the user pressed his heels together.

In some embodiments, accessory device 220 may be operative to recognize inputs provided by a user only when at least one of accessory device 220 and communications device 200 is in a particular configuration. For example, accessory device 220 may recognize inputs provided using a motion sensing component or an environmental sensing component in response to first receiving an instruction or prompt to enable the motion sensing component or environmental sensing component. As another example, accessory device 220 may recognize the output from the one or more motion sensing components and environmental sensing components as a user provided input when outputs are provided in a particular sequence (e.g., tap a pressure sensor three times, then the next output from a motion sensing component or environmental sensing component is an input provided by the user).

As another example, accessory device 220 may be operative to provide inputs to communications device 200 only when communications device 200 opens a communications link with accessory device 220. For example, communications device 200 may accept inputs from accessory device 220 when particular criteria is satisfied. Communications device 200 may open the communications link based on any suitable criteria, including for example the status or mode of communications device 200 (e.g., is communications device 200 receiving an incoming communications, playing back media, or on standby).

Accessory device 220 may include any suitable device or component. For example, accessory device 220 may be a stand-alone device or component operative to be in communication with communications device 200. In some embodiments, accessory device 220 may be incorporated or integrated in an existing device or component. For example, accessory device 220 may include, or be integrated in, a key fob, a card (e.g., a credit card shaped device), a portable drive (e.g., a flash drive), a watch, a widget (e.g., a coin-sized object), or any other suitable device or object that may be unobtrusively carried in a user's pocket, purse or bag. In some embodiments, accessory device 220 may include a clip or other connecting mechanism for attaching accessory device 220 to an object that the user typically carries. For example, accessory device 220 may be clipped or attached to a user's wallet, cellular telephone, personal media device (e.g., an iPod), wired headset, wireless headset, watch, bag, belt, article of clothing, or any other suitable object.

As another example, accessory device 220 may be incorporated in an article of clothing, shoe, wristband (e.g., watch wristband), clothing accessory (e.g., cuff links), or any other article that a user may typically have. For example, accessory device 220 may include a component that is inserted in the user's shoe to provide inputs to communications device 200 in response to the user tapping his foot. In some embodiments, accessory device 220 may be inserted inside a user (e.g., surgically inserted under a user's skin). For example, if accessory device 220 is inserted in a user's hand, the user may provide inputs by tapping his hand or fingers in a particular manner, or waving his hand over a particular trajectory.

As one example, accessory device 220 may be incorporated in a Bluetooth headset used by a user (e.g., when driving). The Bluetooth headset may include a motion sensing component (e.g., an accelerometer) such that the user may move his head to direct accessory device 220 to provide inputs to communications device 200. For example, the user may shake his head in different ways to provide "Yes" and "No" inputs. In some embodiments, accessory device 220, communications device 200, or both may be configured to correlate different sensor outputs as particular user inputs (e.g., user-defined correlations or automatic correlations, for example based on local customs).

In some embodiments, a particular communications device 200 may be selectively coupled with several accessory devices 220. Each of the several accessory devices 220 may include the same or different switches, buttons, keys, motion sensing components, environmental sensing components, or other components for providing an input. The particular input mechanism used in each accessory device 220 may be selected based on the location of the accessory device, or the most appropriate manner for providing an input (e.g., based on the location of the accessory device). In some embodiments, an accessory device 220 may be placed in each of the locations where a user could receive a communication at an inopportune time and be required to respond without using his hands. For example, an accessory device 220 may be located in a user's car (e.g., by the user's left foot), in conference rooms (e.g., integrated on conference room chairs or in the floor by a user's chair), in a user's desk (e.g., under the desk for actuation by the user's knee), in different apparel used by the user, or any other location accessible to the user.

Communications device 200 may be coupled to a particular one of several accessory devices 220 when communications device 200 and the particular accessory device 220 are in the same communications network. For example, each accessory device 220 may generate a short-range communications network for providing instructions to communications device 200. As another example, communications device 200 may generate a communications network for receiving instructions from an accessory device 220 located within the communications network. If communications device 200 identifies several accessory devices 220 within the communications network (e.g., communications device 200 is within the communications networks created by several accessory devices 220, or several accessory devices 220 are within the communications network created by communications device 200), communications device 200 may use any suitable approach for selecting one or more of the accessory devices from which to receive inputs. For example, communications device 200 may prompt the user to select one of the accessory devices 220 (e.g., provide a selectable listing of accessory devices 220 that includes information identifying the accessory devices), or may automatically select one or more accessory devices 220 based on any suitable criteria (e.g., strength of signal, inputs received from accessory devices, or previously identified accessory devices).

As another example, if an accessory device 220 identifies several communications devices 200 within the communications network (e.g., accessory device 220 is within the communications networks of several communications devices 200, or several communications devices 200 are within the communications networks created by an accessory device 220), remote device 220 may use any suitable approach for selecting one or more of the communications devices to which to provide inputs. For example, automatically select a communications device 200 based on any suitable criteria (e.g., strength of signal, inputs or signals received from communications devices, or previously identified communications devices). In some embodiments, each accessory device 220 may be associated with a particular location. For example, an accessory device may be associated with a particular chair in a conference room, where the chair includes circuitry for identifying the communications device of the user sitting in the chair and for providing the identifying information of the communications device to the accessory device.

Communications link 230 may include any suitable type of communications link for providing an input from accessory device 220 to communications device 200. For example, communications link 230 may include any suitable wired communications link (e.g., coupled to a connector, such as a jack or a 30 pin connector of communications device 200). As another example, communications link 230 may include any suitable wireless communications link, such as a short-range communications link. Communications link 230 may be provided using any suitable protocol, including for example Wi-Fi (e.g., a 802.11 protocol), Bluetooth (registered trademark), high frequency systems (e.g., 900 MHz, 2.4 GHz, and 5.6 GHz communication systems), infrared, GSM, GSM plus EDGE, CDMA, quadband, and other cellular protocols, VOIP, or any other suitable protocol. In some embodiments, communications link 230 may be provided using a communications network created by at least one of communications device 200 and accessory device 220.

Using a communications device, a user may receive communications at any time. Sometimes, a communications device may inform the user of incoming communications at inopportune times (e.g., a telephone rings for an incoming telephone call), and may cause a distraction to the user. For example, a user may be in a meeting, or having a conversation, and the user's communications device may ring or vibrate to inform the user of an incoming call. As another example, the user may be driving an automobile, and the user's communications device may ring or vibrate to inform the user of an incoming call. To avoid such distractions, users may sometimes modify the type of notification used by the communications device (e.g., vibrate only, or on-screen display only) to reduce the affect of a notification on the user and other parties. If a user is less attentive, however, the user may fail to notice a less-obtrusive notification and risk missing an important communication (e.g., if the communications device provides an on-screen display only and the user is not watching the screen).

In some embodiments, the user may set the communications device to selectively allow incoming communications. For example, the communications device may only allow communications from specific users, at specific times, from specific locations, or based on any other criteria or combination of criteria. A communications device for controlling interruptions is be described in more detail in commonly owned U.S. Provisional Patent Application No. 60/936,935, filed Jun. 22, 2007, which is incorporated by reference herein in its entirety.

Although such approaches may be useful to limit interruptions and to reduce disruptions during meetings or other activities, the act of answering an incoming communications by providing an input using the input mechanism of the communications device may be inherently disruptive. For example, the mere act of picking up a communications device to answer a telephone call, telling the other party to wait while the user steps out, and stepping out may be disruptive or even rude (e.g., in a meeting or in a movie theater). As another example, looking at a communications device and providing an input using the user's hand while driving may be distracting or even dangerous.

To further reduce disruptions when communications are received at inopportune times, the communications device may be operative to receive inputs provided using an accessory device. Because the user's hands may typically be visible or discernable during a meeting, it may be desirable for the accessory device to be actuated without using the user's hands. For example, it may desirable to actuate the accessory device using the user's feet, or by moving the user's head.

When the communications device receives a communication, the communications device may provide a notification to the user using any suitable approach. For example, the communications device may ring, vibrate, or display a message on a display. As another example, the communications device may cause an accessory device to ring, vibrate, or display a message on a display. In response to receiving the notification, the user may provide an input using the accessory device (e.g., with an input mechanism of the accessory device). For example, the user may provide an input using at least one of a switch, button, slider, motion detection component, environmental detection component, or any other suitable input mechanism.

The input provided by the user may direct the communications device to perform any suitable operation. For example, the input may direct the communications device to select an on-screen option, move a cursor or highlight region, navigate menus, select non-displayed options, or perform any other suitable operation. In some embodiments, the user may provide different inputs using the same accessory device. For example, the user may use different input mechanisms of the accessory device, or provide different combinations of inputs using the same input mechanism (e.g., press a switch a different number of times or for different lengths of time, or move a motion detection component in different manners), or both.

Figure 3:
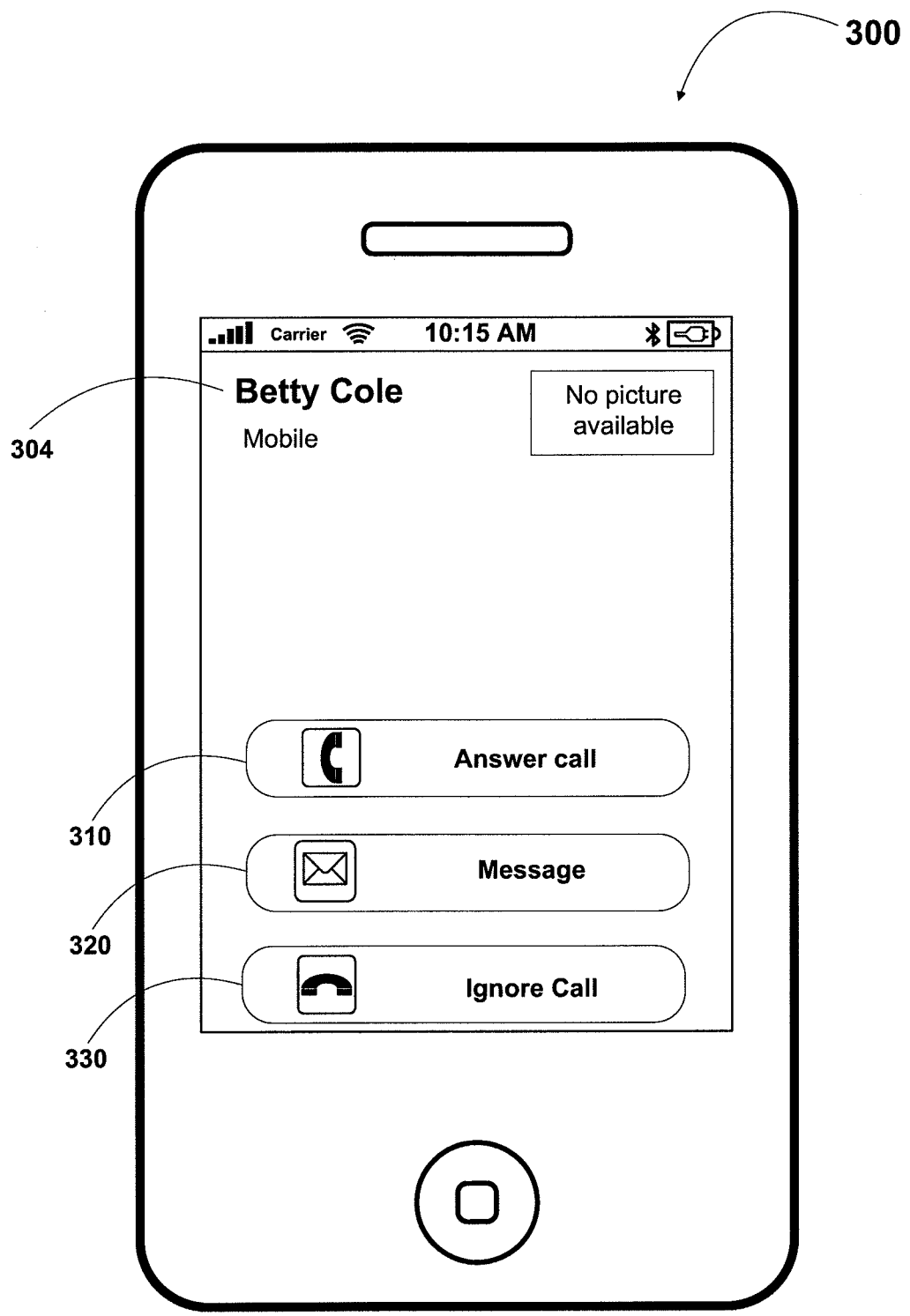
FIG. 3 is a schematic view of an illustrative display screen provided when a communication is received by the communications device in accordance with one embodiment of the invention.

FIG. 3 is a schematic view of an illustrative display screen provided when a communication is received by the communications device in accordance with one embodiment of the invention. Display screen 300 may be displayed on a communications device (which may include some or all of the features of communications device 200, FIG. 2) in response to receiving any suitable communications operation. In the example of display screen 300, the communications operation is a telephone call. It will be understood, however, that the following discussion of FIG. 3 and subsequent figures may be applied to any other suitable communications operation.

When the communications device receives an incoming communications request, the communications device may identify the person from whom the communications request has been received using tag 304. Display screen 300 may include any suitable option for responding to the communications request. For example, displays screen 300 may include answer option 310 and ignore option 330. In response to a user selection of answer option 310 or ignore option 330, the communications device may answer or ignore the incoming call, respectively.

If an accessory device is available, the user may provide any suitable instruction to the communications device using the accessory device. For example, the user use the accessory device to provide an instruction to turn of a ringer, stop vibrating, answer, send call to voicemail, or any other suitable instruction. In some embodiments, the user may use the accessory device to select an on-screen option.

In some embodiments, display screen 300 may include message option 320. In response to receiving a selection of message option 320, the communications device may automatically provide a message to the person calling the user. The user may select message option 320 using an input mechanism of the communications device, or using an accessory device (e.g., accessory device 220) to discreetly respond to an incoming communication. In some embodiments, message option 320 may be displayed only when the communications device has established a communications link with a remote communications device, when the communications device knows the user could be looking at display screen 300 (e.g., when a proximity sensor does not indicate the communications device is in a dark room), for every incoming communication, or based any other suitable criteria. To ease a user's interactions with an accessory device, message option 320 may be the first option available for selection using the accessory device (e.g., a highlight region may be placed over message option 320 when a communications link is available between the communications device and an accessory device).

Figure 4:
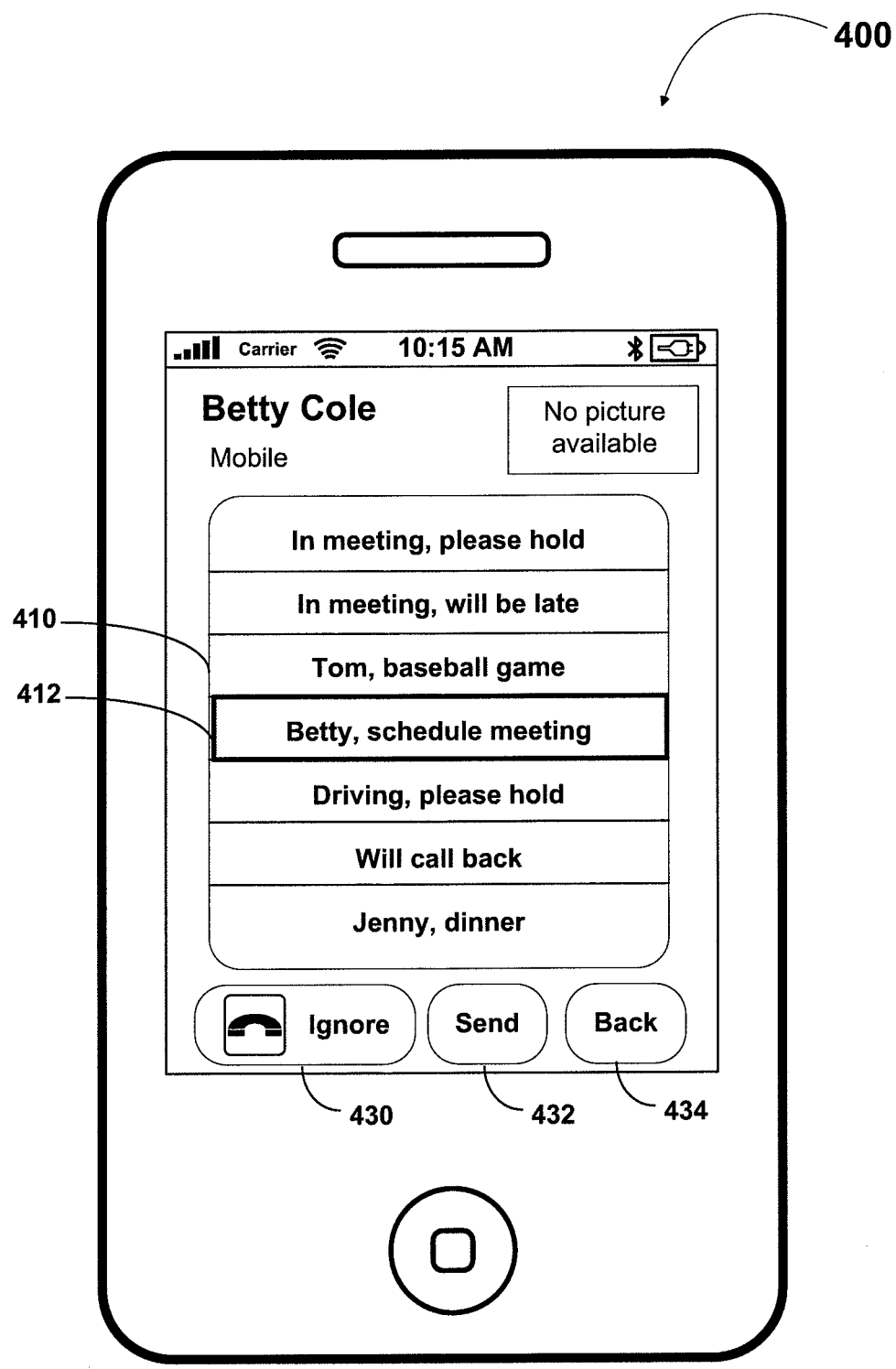
FIG. 4 is a schematic view of a display screen for selecting a message to provide to another party in accordance with one embodiment of the invention.

In response to receiving a selection of message option 320, the communications device may provide a default or generic message to the party sending a communication. Alternatively or in addition, in response to receiving a selection of message option 320, the communications device may display a selectable listing of messages that the user may select to provide to the other party. FIG. 4 is a schematic view of a display screen for selecting a message to provide to another party in accordance with one embodiment of the invention. Display screen 400 may include listings 410 of messages that the user may select to transmit to the other party.

The message identified in listings 410 may include any suitable messages. For example, the messages may include messages sent as text (e.g., email messages or text messages), messages sent as audio (e.g., recorded messages or voicemail messages), combinations thereof, or any other suitable message. In some embodiments, listings 410 may identify the type of message (e.g., using an icon or coloring scheme). The communications device may display listings for different messages based on the party sending the communications request. For example, the listings displayed may include listings for messages directed to the other party, or to other users associated with the other party (e.g., the other party's manager or direct reports). As another example, the listings displayed may include listings for message types for which the communications device knows the other party's contact information (e.g., display email messages only if the communication device knows the other party's email address).

In some embodiments, the user may select the mode with which a message is transmitted. For example, each message may be provided as text, and transmitted as text (e.g., by email or text message) or by audio (e.g., by applying a voice signature to the text to create an audio file to playback or transmit). In response to receiving a user selection of a listing, the user may select the mode for the message. In some embodiments, the modes available for a particular other party may depend on the contact information available to the communications device for the other party.

Figure 5:
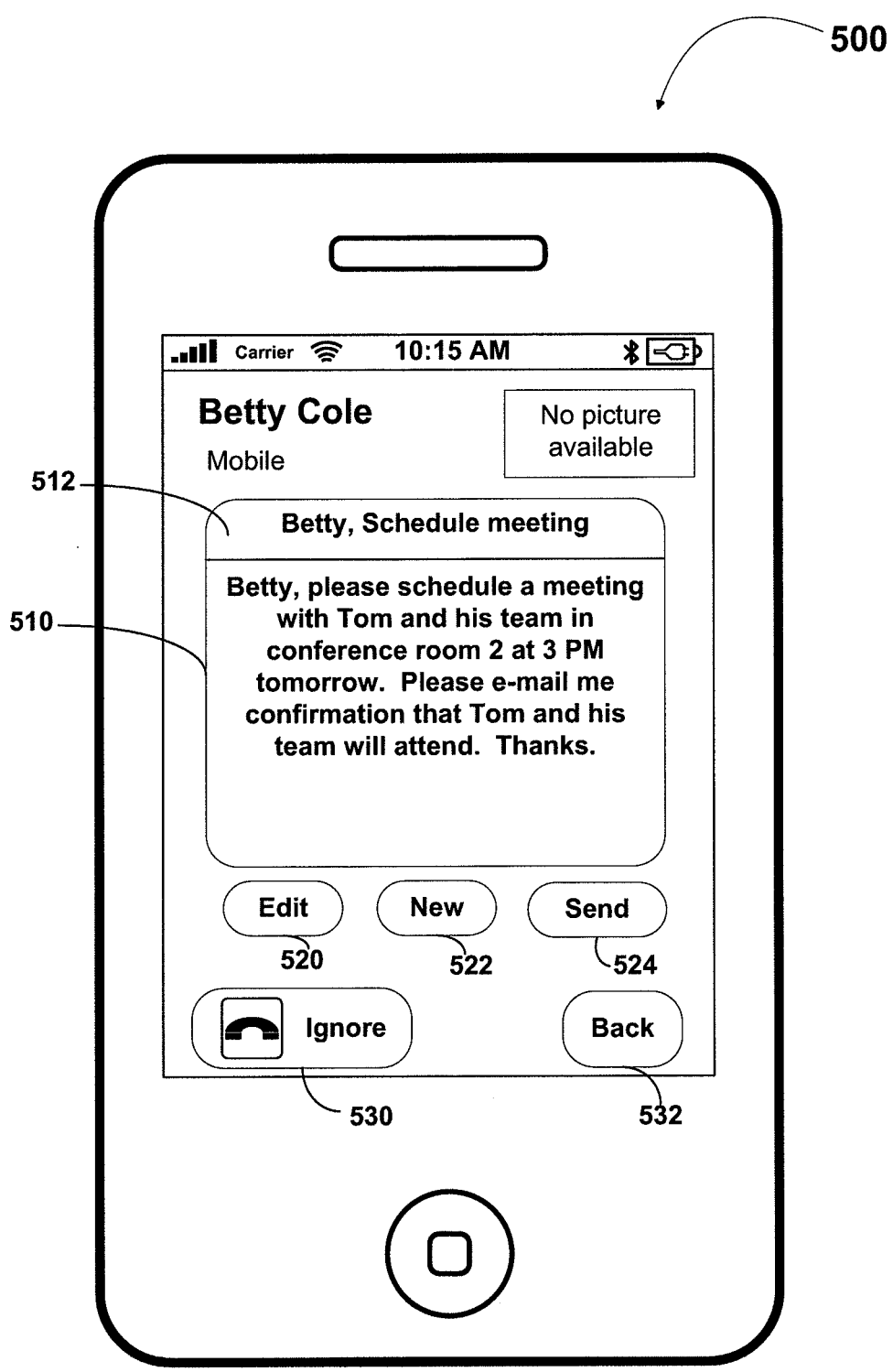
FIG. 5 is a schematic view of a message to be sent to another party in accordance with one embodiment of the invention.

Each listing 410 may include a short identifier indicating the content of the message. In some cases, messages may be specific to particular contacts, and may include the contact name associated with the message. The user may select a listing 410 by placing highlight region 412 over a listing. In some embodiments, in response to receiving a user selection of a listing, the communications device may display the message in its entirety for the user to review before sending. FIG. 5 is a schematic view of a message to be sent to another party in accordance with one embodiment of the invention. Display screen 500 includes message 510, which may be identified by tag 512 (e.g., the same tag used in listings 410, FIG. 4, to identify the message). Message 510 may include the text of a message transmitted as text (e.g., an email or text message), or a transcript of a message transmitted as audio (e.g., a recording to play back or a voice mail).

After reviewing message 510, the user may elect to edit the message by selecting edit option 520. In response to selecting edit option 520, the communications device may display a keyboard and cursor for the user to edit the message. If the message is an audio message, the communications device may prompt the user to record a new message or portion of the message, or may prompt the user to edit the text of the message to apply a voice signature to the edited message. If the user wishes to create a new message, the user may select new option 522.

If the user elects to send the message to the other party, the user may select send option 524. In response to receiving send option 524, the communications device may send the selected message to the other party using the selected transmission mode. For example, if the transmission mode is email or text message (e.g., sending the message as text), the communications device may remove the notification for the incoming communication (e.g., silence the ringer and return the display screen to its standby state) and transmit the message. If applicable, the communications device may direct the other party to voicemail. If the message is an audio message, the communications device may first determine whether the incoming communication is an audio communication (e.g., a telephone call). If it is, the communications device may answer the incoming communication, and play back the audio. After playing back the audio message, the communications device may end the communication (e.g., hang up), wait a delay for the user to speak before hanging up or going to voicemail, if applicable (e.g., long enough for the user to excuse himself from a meeting), go to voicemail, if applicable, or wait indefinitely. If the communication is not an audio communication, the communications device may initiate an audio communication (e.g., a telephone call) with the other party and play back the audio message when the other party answers the communications request. After playing back the message, the communications device may end the communication or wait, as described above.

If the user does not participate in the received communication (e.g., does not speak during the telephone call), the communications device may place a reminder in the user's calendar, or schedule an outgoing communications operation with the other party at a future time. Systems and methods for scheduling future communications operations are described in more detail in commonly assigned U.S. Pat. application Publication No. 2009/0170492, published on Jul. 2, 2009, and entitled "USER-AUTOMATED CALL OUT AND RING".

The user may ignore the incoming communications operation by selecting ignore option 530. In response to receiving a selection of back option 532, the communications device may return to display screen 400 (FIG. 4) to allow the user to select another listing, or may return to display screen 300 (FIG. 3). Returning to display screen 400, once the user has placed highlight region 412 over a particular listing, the user may select send option 432 to transmit the selected message to the other party (e.g., as described above in connection with send option 524). If the user instead elects not to send a message, the user may select back option 434 and return to display screen 300. If the user elects to ignore the incoming communications request, the user may select ignore option 430.

Figure 6:
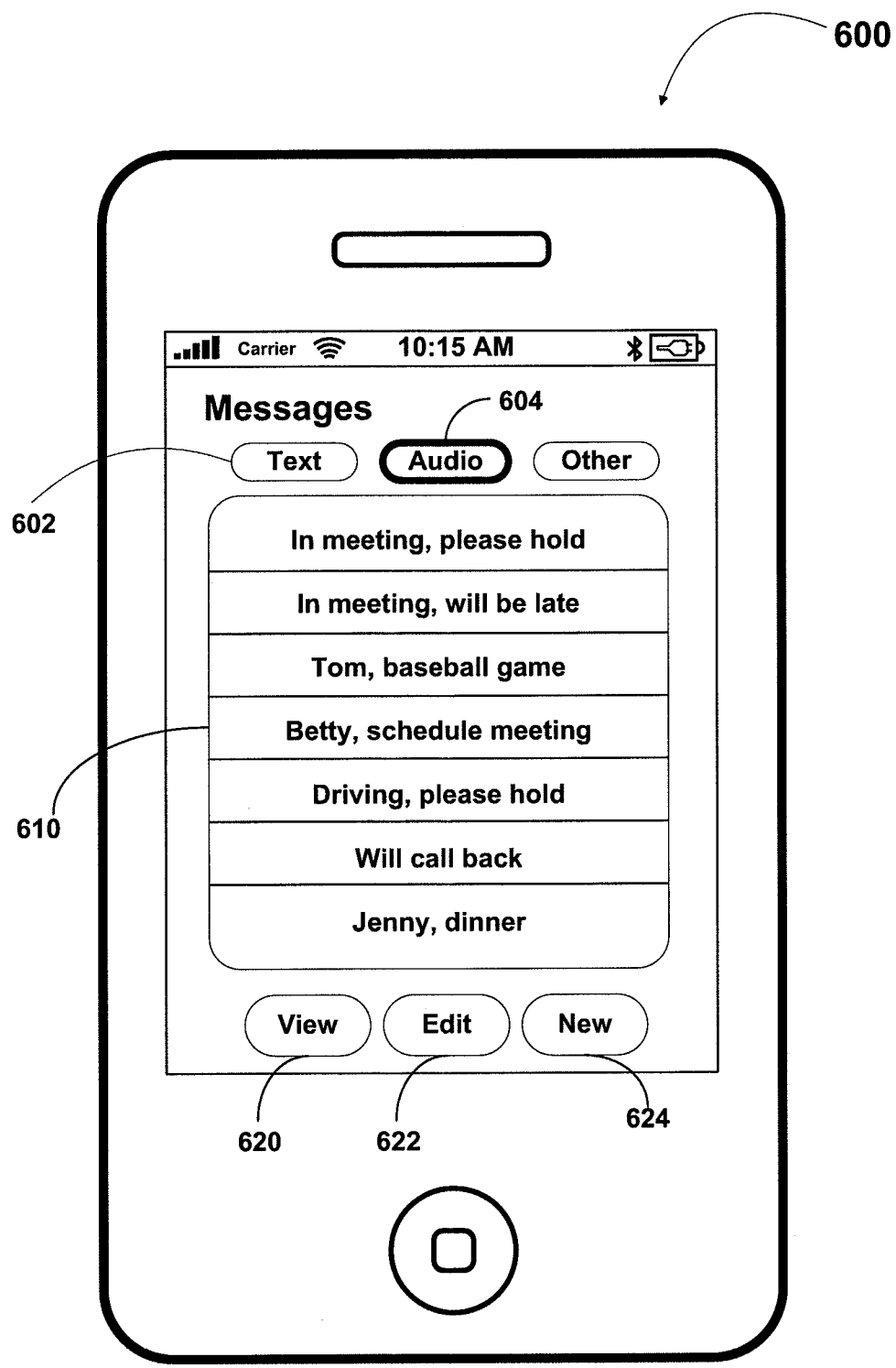
FIG. 6 is a schematic view of an illustrative display screen of messages available for transmission in accordance with one embodiment of the invention.

For messages to be useful, the user may desire to organize or create new messages prior to receiving communications requests from other users at inopportune times. The user may view existing messages using any suitable approach. For example, the user may select an on-screen messages option, or provide any other input for accessing a messages display screen. FIG. 6 is a schematic view of an illustrative display screen of messages available for transmission in accordance with one embodiment of the invention. Display screen 600 may include several types of messages available for transmission to another user. Messages may be organized using any suitable approach, including for example by type. Display screen 600 may include selectable type options 602, which may be used to display only messages associated with the selected type. The user may select a particular type option 602 using highlight region 604. Suitable type options 602 may include, for example, text, audio, video, email, text message, other, or any other suitable type of message. In some embodiments, display screen 600 may include a type option for displaying all of the available messages, independent of their type.

In response to receiving a selection of a type option 602, or in response to automatically selecting a type option (e.g., based on the incoming communication), display screen 600 may display listings 610 of available messages. The messages in listings 610 may be displayed using any suitable approach. For example, the messages may be displayed in alphabetical order, based on the contact to whom the message is addressed, based on the time/date created, or any other suitable criteria. In some embodiments, display screen 600 may include a search field to assist a user in finding a particular message in listings 610.

In response to selecting a particular listing, the user may view the message (e.g., in response to selecting view option 620) or edit the message (e.g., in response to selecting edit option 622).

In response to receiving a user request to edit an existing message, the communications device may display a suitable interface. For example, the communications device may display the text of a message and display a keyboard. As another example, the communications device may display a visual representation of an audio recording and options to record over portions or add portions to the recording. In some embodiments, the communications device may provide an option for deleting a message in response to receiving a user request to edit a message.

Figure 7:
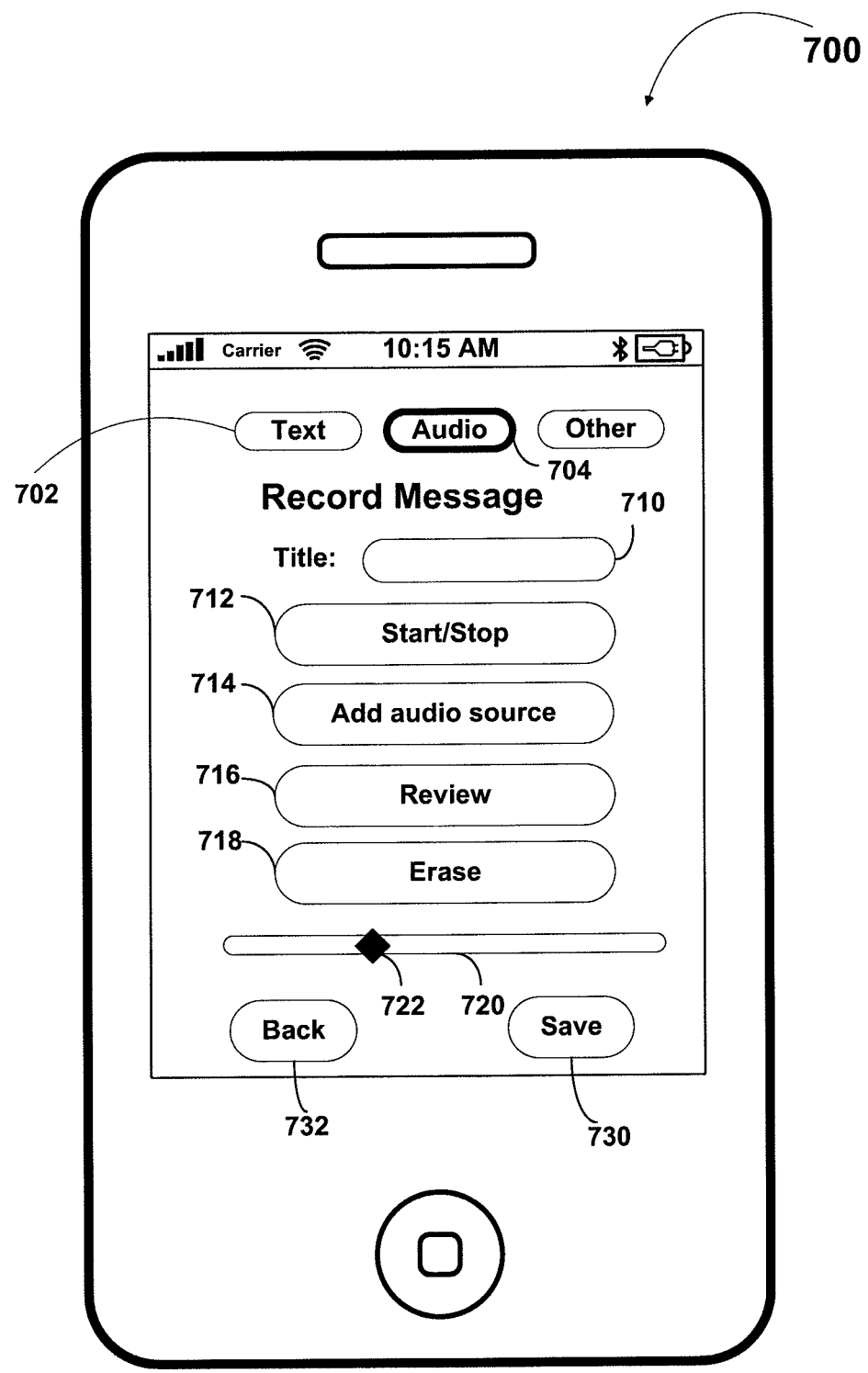
FIG. 7 is a schematic view of a display screen for creating a new message in accordance with one embodiment of the invention.

A user may create a new message using any suitable approach. For example, a user may select new option 624. In response to receiving a request to create a new message, the communications device may display a new screen. FIG. 7 is a schematic view of a display screen for creating a new message in accordance with one embodiment of the invention. Display screen 700 may include several options for the user to select the type of message to create. For example, display screen 700 may include selectable type options 702, which may be selected to define the type of message to create (e.g., using highlight region 704). Suitable type options 702 may include, for example, text, audio, video, email, text message, other, or any other suitable type of message.

In response to receiving a user request to create a message using text, the communications device may display a keyboard or provide any other suitable input mechanism for entering alphanumeric characters for the message. In response to receiving a user request to create a message using audio, as shown in FIG. 7, the communications device may display several options for creating an audio recording. Display screen 700 may include title option 710, which the user may select to provide a title for the new audio message (e.g., to identify the message in listings 610, FIG. 6). To provide audio to the communications device for the audio message, the user may select start/stop option 712 and record a message. The user may select other audio sources for the message using add audio source option 714. In response to receiving a user selection of add audio source option 714, the communications device may display a listing of some or all available audio sources for selection by the user (e.g., a listing of available songs for playback).

The user control the current playback position of the message using playback bar 720. By selecting a particular moment in the message with cursor 722, the user may record audio or provide audio from existing sources during any portion of the message, and can go back and edit particular portions of the message (e.g., re-record certain portions, or overlay several audio signals, such as several voices or a voice and a song). Once the user has finished preparing the message, the user may review the message (e.g., by selecting review option 716). If the user wishes to erase some or all of the message, the user may select a corresponding erase option (e.g., erase option 718).

The user may save a new message using any suitable approach. For example, the user may select save option 732. In response to receiving a user selection of save option 732, the communications device may automatically return to display screen 600 (FIG. 6), or any other suitable display screen. If the user does not wish to save the message created or does not wish to create a message at all, the user may select back option 730 to return to any other suitable display screen of the communications device (e.g., display screen 600, or any other display screen from which the user may have navigated to display screen 700).

In some embodiments, other approaches may be used instead of or in addition to an accessory device for managing disruptive communications requests. One other approach may include defining an urgent mode available only for those communications that are deemed urgent by the sender. When a communications device receives a communication that is identified as being urgent from another party, the communications device may enable an urgent mode to ensure that the recipient receives the communication in a timely manner.

The urgent mode may include any suitable feature for making sure that a communications request is promptly received. In some embodiments, the communications device may modify the notification scheme of the communications device to make it more prominent. As one example, if the communications device is in a silent mode, the urgent mode may switch the communications device to a vibrate mode. As another example, if the communications device is in a normal ring mode, the urgent mode may switch the communications device to an outdoors mode. The communications device may make the notification progressively more prominent (e.g., more prominent as more time passes and as the communication becomes more urgent), or may rapidly jump to a more prominent notification. In some embodiments, the urgent mode may cause the communications device to immediately output the loudest and most prominent notification.

In some embodiments, the notification may repeat at regular intervals or without ceasing until the user responds to the urgent communication. For example, the communications device may repeat a notification at progressively shorter intervals until the notification is continuous (and the urgency greater). In some embodiments, the notification may continue even after the other party has ceased an attempt to communicate with the user (e.g., after the other party has hung up the telephone). The notification may then indicate the party who called, and contact information for contacting that party.

Because the purpose of the urgent mode is to encourage the user to perform a communications operation with the other party, in some embodiments the communications device may not allow inputs provided by accessory devices for an urgent communication. For example, the communications device may not allow the user to provide a default message as a response to an urgent communication. As another example, inputs provided by accessory devices may be encouraged as a manner of quickly responding to an urgent communication without being excessively distracting. To ensure that the user responds properly to the party requesting an urgent communications operation, however, the communications device may prevent the user from providing default or generic messages to the other party (e.g., using an accessory device).

Figure 8:
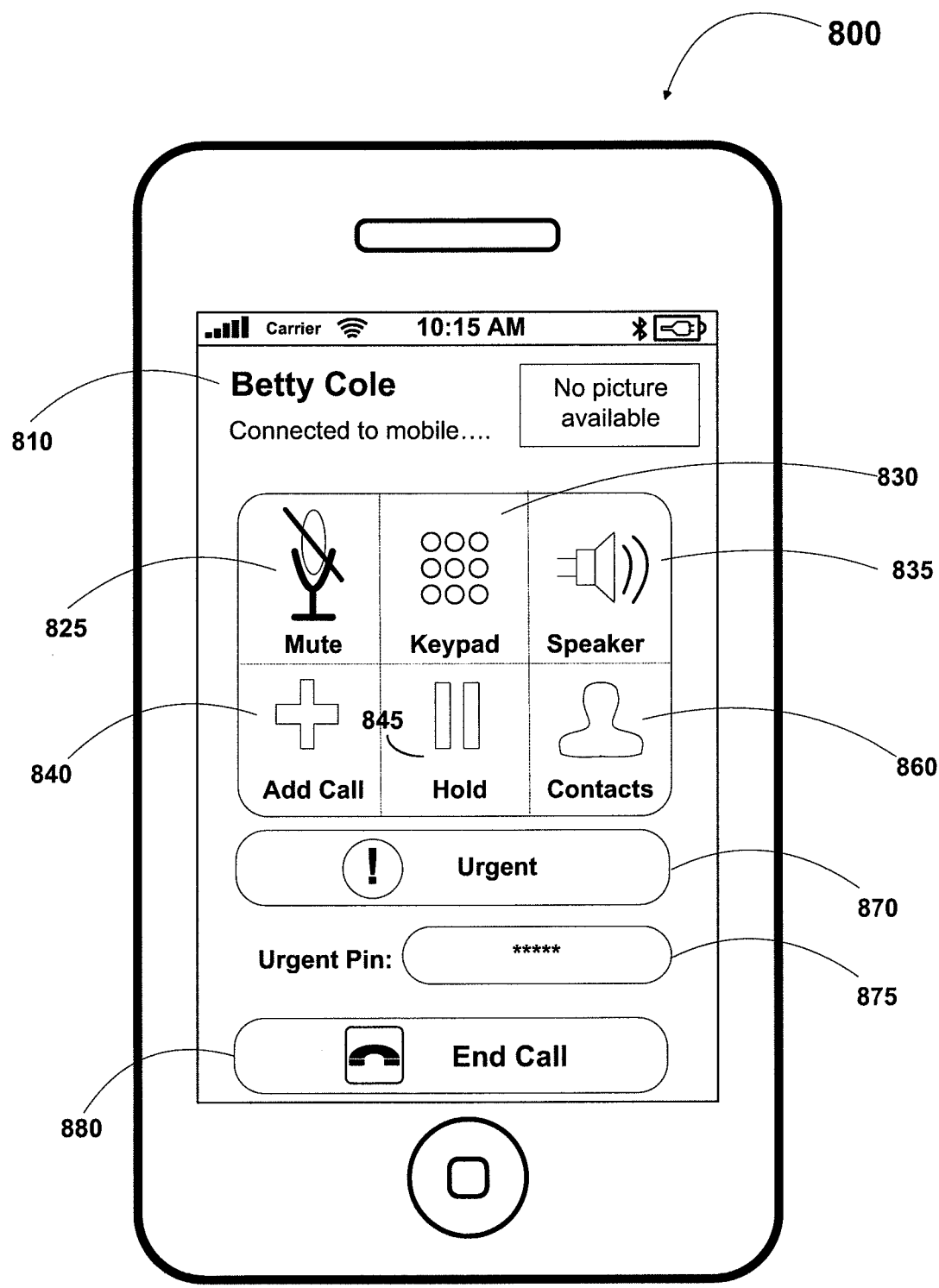
FIG. 8 is a schematic view of an illustrative display screen for indicating that a communication is urgent in accordance with one embodiment of the invention.

The user may direct the sending communications device to identify a communications request as being urgent using any suitable approach. FIG. 8 is a schematic view of an illustrative display screen for indicating that a communication is urgent in accordance with one embodiment of the invention. Display screen 800 may include contact information 810 identifying the contact to whom the communications request is being sent. Display screen 800 may include several options for controlling various aspects of a communications operation. For example, display screen 800 may include mute/unmute option 825, keypad option 830, speaker option 835, add call option 840, hold/unhold option 845, and contacts option 860. In some embodiments, some or all of the options displayed on display screen 800 may be grayed out or unavailable until a communications path is established with the contact identified by contact information 810. The user may terminate a communications operation or communications request by selecting end call option 880.

As the user initiates a communications operation, the user may indicate that the communication is urgent using any suitable approach. For example, the communications device may prompt the user to provide an entry to make a communications request urgent after receiving an instruction to begin the communications request (e.g., an audio prompt to press "1" for an ordinary communication, and "2" for an urgent communication). As another example, the user may select urgent option 870. In response to selecting urgent option 870, the communications device may automatically flag the communications operation as urgent, and indicate the urgency of the communication to the contact receiving the communications request. The communications device may indicate that a communications request is urgent using any suitable approach. For example, the communications device may transmit metadata or other data along with the communications request to the recipient. For example, the communications request transmitted to the recipient may include a flag, code, or other data detectable by the recipient communications device, and interpreted by the recipient communications device as a request to enable an urgent mode. In response to receiving the data, the recipient communications device may activate or enable an urgent mode, and indicate the urgent communications request to the recipient (e.g., using an approach described above).

In some embodiments, the communications device may transmit a text message or other data communication over a different communications path or as a different communication to the recipient communications device. The other data may include any suitable information or instruction for the recipient communications device. For example, the other data may include a flag, code, or other instruction directing the recipient communications device to enable an urgent mode. As another example, the other data may not include any particular instruction or information, but rather the simultaneous receipt of a communications request and another data communication may trigger the recipient communications device to enable an urgent mode (e.g., simultaneously receiving a text message and telephone call from a contact may cause the recipient communications device to enable an urgent mode).

In some embodiments, the user may be required to enter an appropriate code or key to direct the communications device to provide an urgent communications request. The key may be created or defined by the user, or may instead be automatically defined by the communications device. The user may enter the code using any suitable approach. For example, display screen 800 may include code prompt 875 in which the user may enter a code or key for directing the recipient device to provide an urgent communications request. In some embodiments, code prompt 875 may not be initially displayed, but may be displayed in response to a user selection of urgent option 870. If the selected recipient does not require a code to provide an urgent message, code prompt 875 may not be displayed. In some embodiments, once the user has entered an appropriate code or key in code prompt 875 for a first urgent communications request, the communications device may save the entered code or key and automatically provide the code or key without requiring the user to re-enter it (e.g., extract a key from a received V-card of the recipient contact). If the communications device has the proper code or key stored in memory, display screen 800 may not include code prompt 875, or may instead display code prompt 875 with the code already entered.

In some embodiments, the communications device may compare the code or key provided by the user with a known code or key associated with the recipient contact. For example, the recipient contact may provide a code or key to the communications device for determining whether an urgent communications request is authorized. In response to determining that a code provided by the user matches the code or key provided by the recipient contact, the communications device may transmit an urgent communications request. If instead the communications device determines that the code provided by the user does not match the code or key provided by the recipient contact, the communications device may transmit an ordinary (e.g., non-urgent) communications request.

In some embodiments, the communications device may transmit the code or key entered by the user with the communications request. The recipient communications device may compare the received code or key with a locally stored code or key, and determine whether the provided code or key is correct. If the provided code or key is incorrect, the recipient communications device may treat the incoming communications request as an ordinary communications request. If instead the provided code or key is correct, the recipient communications device may treat the incoming communications request as an urgent communications request and enable an urgent mode.

In some embodiments, instead of or in addition to transmitting additional information with a communications request, the communications device may use different addresses for the recipient contact (e.g., different telephone numbers) based on the urgency of the communication. For example, each communications device may be assigned at least two different addresses for a particular type of communication operation, where communications received from the first address are treated as ordinary communications, and communications received from a second address are treated as urgent communications (e.g., and cause the recipient communications device to enable the urgent mode). When a user directs a communications device to transmit an urgent communications request, the user's communication device may send the communications request to the particular address associated with urgent requests.

In some embodiments, only particular contacts may be authorized to provide urgent communications requests to a particular user. For example, only contacts saved in the user's communications device may be authorized to transmit an urgent communications request to the user's communications device. As another example, only particular contacts stored in the user's communications device (e.g., only favorite contacts) may be authorized to transmit urgent communications requests to the user's communication device.

Figures 9, 10:
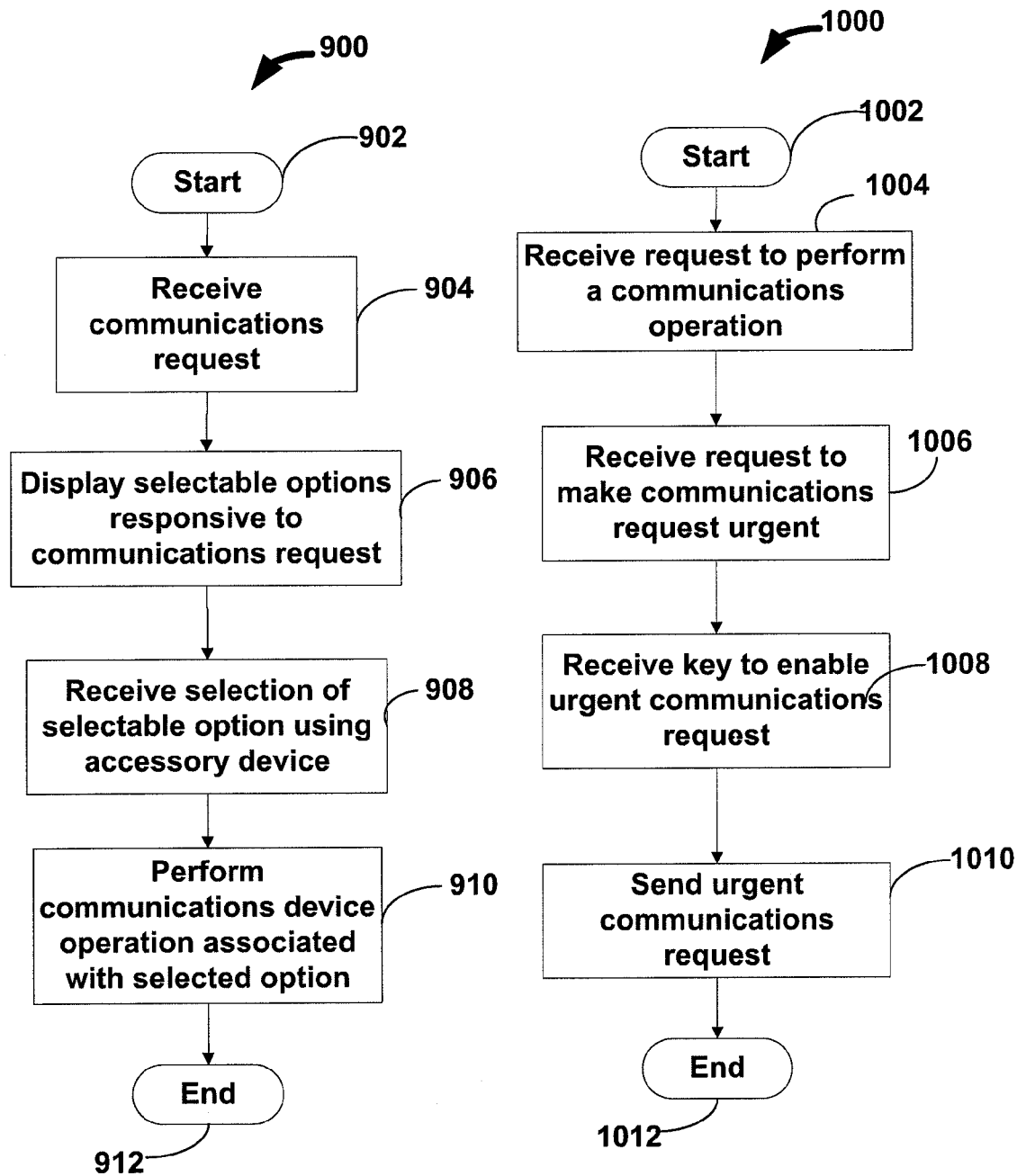
FIG. 9 is a flow chart of an illustrative process for responding to communications requests using an accessory device in accordance with one embodiment of the invention.
FIG. 10 is a flowchart of an illustrative process for transmitting an urgent communications request in accordance with one embodiment of the invention.

FIG. 9 is a flow chart of an illustrative process for responding to communications requests using an accessory device in accordance with one embodiment of the invention. Process 900 may begin at step 902. At step 904, the communications device may receive a communications request. For example, the communications device may receive an incoming telephone call, or an incoming data communication (e.g., an email or a text message). At step 906, the communications device may display selectable options response to the incoming communications request. For example, the communications device may display an option for responding the received communications device. As another example, the communications device may display one or more options for automatically providing a response to the incoming communications request (e.g., a personalized response, a default response while the user leaves a meeting, or a specific greeting).

At step 908, the communications device may receive a selection of a displayed selectable option from an accessory device. For example, the communications device may receive an input corresponding to one of the options displayed at step 906. The accessory device may be any suitable input device remote from the communications device for providing an input to the communications device. The accessory device may include any suitable device having an input mechanism for providing an instruction to the communications device. For example, the accessory device may include some or all of the features of accessory device 220 (FIG. 2).

At step 910, the communications device may perform the operation associated with the option selected at step 908. For example, the communications device may provide a greeting or other message in response to the communications request. As another example, the communications device may answer the communications request, or transfer the communications request to voicemail. Process 900 may then end at step 912.

FIG. 10 is a flowchart of an illustrative process for transmitting an urgent communications request in accordance with one embodiment of the invention. Process 1000 may begin at step 1002. At step 1004, the communications device may receive a request to perform a communications operation. For example, the communications device may receive a user selection of a contact with whom to perform a communications operation. As another example, the communications device may receive selections of an address and a communications operation type for performing a communications operation. As still another example, the communications device may receive a user selection of a recipient communications device with which to perform a communications operation. At step 1006, the communications device may receive a request to make the communications request urgent. For example, the communications device may receive a user selection of an on-screen urgent option. As another example, the address received by the user (e.g., at step 1004) may be an address for providing urgent requests to a recipient (e.g., an urgent telephone number instead of an ordinary telephone number).

At step 1008, the communications device may receive a key to enable the urgent communications request. For example, in response to receiving the user request to make a communications request urgent, the communications device may display a prompt for the user to enter a code or key for enabling the urgent mode for the recipient contact. The communications device may perform any suitable operation with the received code or key. For example, the communications device may compare the received code or key with a code or key received from the recipient communications device. As another example, the communications device may provide the received code or key to the recipient communications device with the communications request as part of an urgent communications request. The recipient communications device may then compare the received code or key with a locally stored code or key to determine whether the urgent communications request may be allowed. In some embodiments, if a key for enabling the urgent communications operation is not necessary, step 1008 may be skipped.

At step 1010, the communications device may send an urgent communications request to the recipient communications device. For example, the communications device may send a communications request combined with data defining an urgent request (e.g., an urgent flag or data message). As another example, the communications device may send a communications request to a particular address that is associated with urgent communication operations. As still another example, the communications device may send an urgent communications request that includes the code or key received at step 1008. Process 1000 may then end at step 1012.

Figure 11:
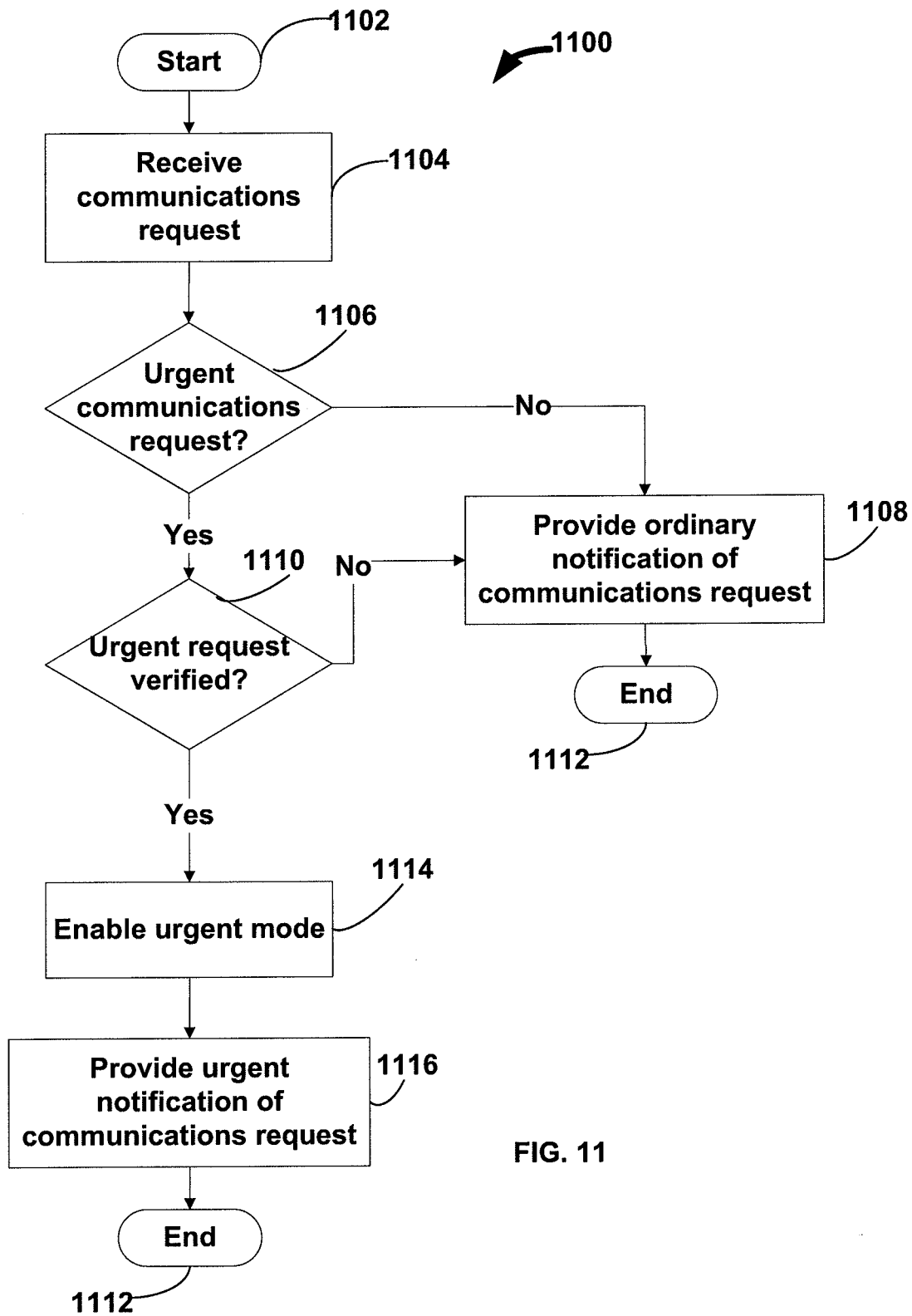
FIG. 11 is a flowchart of an illustrative process for receiving an urgent communications request in accordance with one embodiment of the invention.

FIG. 11 is a flowchart of an illustrative process for receiving an urgent communications request in accordance with one embodiment of the invention. Process 1100 may begin at step 1102. At step 1104, the communications device may receive a communications request. For example, the communications device may receive an incoming telephone call, or an incoming data communication (e.g., an email or a text message). At step 1106, the communications device may determine whether the communications request is an urgent communications request. For example, the communications device may determine whether the incoming communications request includes a flag or other additional data identifying an urgent communications request. As another example, the communications device may determine whether several communications requests (e.g., at least a first communications request and a second communications request) or communications operations are received from the same contact using different modes of communications operation (e.g., simultaneous or near-simultaneous receipt of a telephone call and a text message). As still another example, the communications device may determine whether the address used to address the communications device is an address that is associated with urgent communications requests.

If, at step 1106, the communications device determines that the received communications request is not urgent, process 1100 may move to step 1108. At step 1108, the communications device may provide an ordinary notification of the received communications request. For example, the communications device may provide a ringing or vibrating notification (e.g., as determined by the current mode of operation of the communications device). Process 1100 may then end at step 1112.

If, at step 1106, the communications device instead determines that the received communications request is urgent, process 1100 may move to step 1110. At step 1110, the communications device may determine whether the urgent communications request has been verified. For example, the communications device may compare a code or key received with the urgent communications request to an authorization code or key stored locally with the communications device. As another example, the communications device may determine whether the contact sending the urgent communications request is authorized to send an urgent communications request. If the communications device determines that the urgent communications request has not been verified (e.g., the urgent communications request is not allowable), process 1100 may move to step 1108, described above.

If, at step 1110, the communications device instead determines that the urgent communications request has been verified (e.g., the urgent communications request is allowable), process 1100 may move to step 1114. At step 1114, the communications device may enable an urgent mode. For example, the communications device may switch from an ordinary mode to an urgent mode of notifying the user of the communications device. At step 1116, the communications device may provide an urgent notification of the communications request. For example, the communications device may provide any suitable combination of audio and vibration notifications. The volume and type of audio provided may be changed as necessary to ensure that the user is properly notified of the communications request, as discussed above in connection with FIG. 8. Process 1100 may then end at step 1112.

The above described embodiments of the present invention are presented for purposes of illustration and not of limitation, and the present invention is limited only by the claims which follow.

What is claimed is:

1. A method for transmitting an urgent communications request, comprising:
    receiving with an electronic device a first user instruction to transmit a first communications request;
    detecting with the electronic device a second user instruction to make the first communications request urgent;
    in response to the detecting, providing with the electronic device data that is associated with the first communications request;
    transmitting, substantially simultaneously, after the receiving and detecting, using the electronic device, the first communications request over a first communications path and the provided data over a second communications path to a recipient device, wherein transmitting the first communication request and the provided data substantially simultaneously causes the recipient device to enable an urgent mode of the recipient device and provide an audio notification of the first communications request, wherein the recipient device enabling an urgent mode comprises the recipient device transitioning from a non-audio notification mode to an audio notification mode.

2. The method of claim 1, wherein the first communications path is different from the second communications path.

3. The method of claim 1, wherein the first communications path comprises a telephone communications path.

4. The method of claim 3, wherein the second communications path comprises a text message communications path.

5. The method of claim 1, further comprising receiving authorizing information required for authorizing the first communications request with the recipient device in response to the detecting.

6. A communications device for receiving an urgent communications request, comprising communications circuitry and control circuitry, wherein:
    the communications circuitry is operative to simultaneously receive a first communications request and a second communications request from a transmitting device; and
    the control circuitry is operative to:
        determine whether the received first communications request is the urgent communications request based on the simultaneous receipt of the first communications request and the second communications request;
        in response to a determination that the received first communications request is the urgent communications request, automatically enable an urgent mode and output a notification using a first output setting, wherein enabling an urgent mode comprises transitioning from a non-audio notification mode to an audio notification mode; and
        in response to a determination that the received first communications request is not the urgent communications request, output the notification using a second output setting in the non-audio notification mode.

7. The communications device of claim 6, wherein the second communications request is received using a communications mode that is different than a communications mode in which the first communications request is received.

8. A communications device for transmitting an urgent communications request, comprising:
    circuitry configured to:
        receive a request to initiate a first communication as an urgent communication with a recipient device using a first communication mode;
        transmit a first communications request to the recipient device using the first communications mode in response to the request; and
        transmit a second communications request to the recipient device using a second communications mode in response to the request, wherein the second communications request is transmitted substantially simultaneously to the recipient device with the first communications request, wherein the transmitting the first communications request and the second communications request substantially simultaneously is configured to cause the recipient device to enable an urgent mode of the recipient device.

9. The communications device of claim 8, wherein the recipient device enabling an urgent mode comprises the recipient device transitioning from a non-audio notification mode to an audio notification mode.

10. The communications device of claim 8, wherein the first communications mode supports voice communication, and the second communications mode supports a text message.

11. The communications device of claim 8, wherein the control circuitry is further configured to receive authorizing information required for authorizing the initiation of the communication as an urgent communication.

12. A method for receiving an urgent communications request, comprising:
by a receiving communications device:
receiving a first communications request from a transmitting communications device;
simultaneously receiving a second communications request from the transmitting communications device;
determining that the first communications request and the second communications request were simultaneously received from the same transmitting communications device;
transitioning automatically, based on the determining, from a non-urgent mode of the receiving communications device to an urgent mode of the receiving communications device.

13. The method of claim 12, wherein the first communications request comprises a request for a voice communication, and the second communications requests comprises a request for a text message communication.

14. The method of claim 12, wherein the non-urgent mode comprises a non-audio notification mode, and the urgent mode comprises an audio notification mode.

15. The method of claim 12, further comprising providing an audio notification based on the determining.

16. The method of claim 15, wherein the audio notification continues after the transmitting communications device has ceased communication.

17. The method of claim 12, further comprising receiving an instruction to respond to the first communications request with a default message.

18. The method of claim 12, wherein a function to respond to a communication request with a default message is disallowed by the urgent mode of the receiving communications device.

\* \* \* \* \*